H. M. WEAVER.
Pendulum-Scales.
No. 197,190. Patented Nov. 13, 1877.
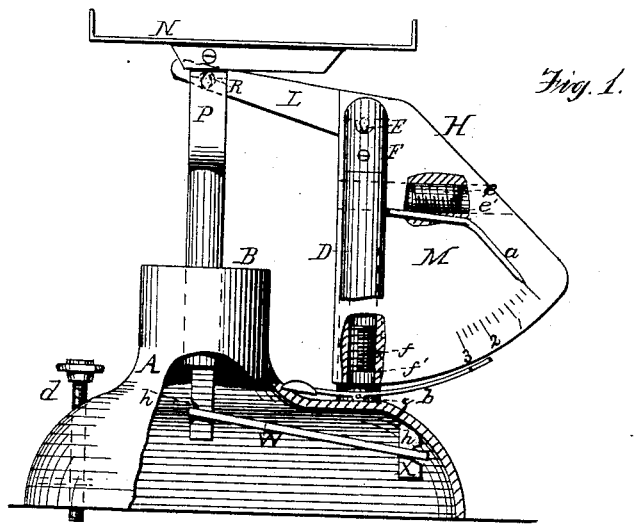
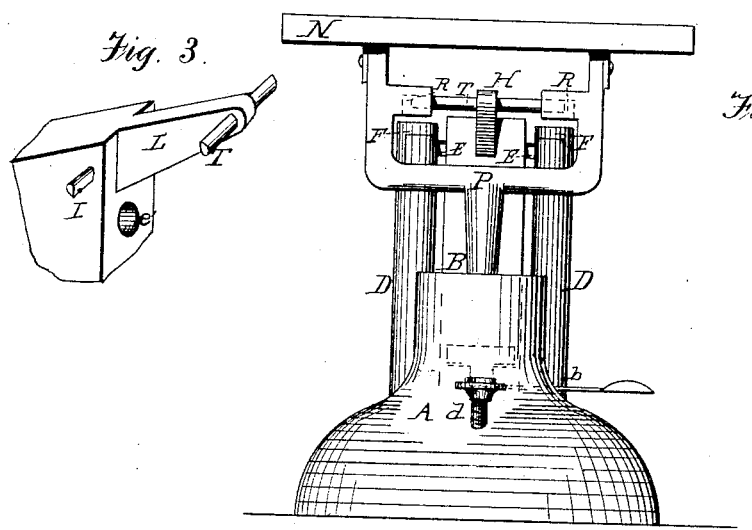
Witnesses:
Chas. P. Gill
N. C. Robinson
Inventor
Henry M. Weaver
by his Attys.
Cox & Cox.

UNITED STATES PATENT OFFICE.

HENRY M. WEAVER, OF MANSFIELD, OHIO.

IMPROVEMENT IN PENDULUM-SCALES.

Specification forming part of Letters Patent No. 197,190, dated November 13, 1877; application filed February 24, 1877.

*To all whom it may concern:*

Be it known that I, HENRY M. WEAVER, of Mansfield, in the county of Richland and State of Ohio, have invented a new and useful Improvement in Weighing-Scales, of which the following is a specification, reference being had to the accompanying drawings.

The invention relates to an improvement in scales; and consists in the mechanism hereinafter specifically described; the object being to provide a suitable device for weighing matter.

Referring to the accompanying drawings, Figure 1 is a side elevation, partly in section, of a device embodying the elements of the invention. Fig. 2 is an end view of same; and Fig. 3, a detached view of part of the lever, showing the knife-edges.

In the accompanying drawings, A represents the frame or base, provided with the central aperture B, and on one end with the standards D, which extend upward a proper distance, and are furnished with bearings E, which are protected by the caps F, secured to the upper ends of the standards. The bent lever H is mounted in the bearings E, and between the standards on the knife-edges I, and is composed of the bar L and weight M, connected at the apex of the weight, the center of gravity of the lever H preponderating outward from the perpendicular sides of the standards D, and is retained in such suspended position by the weight of the platform N and arm P, suspended on the knife-edge T, at the end of the bar L, by the bearings R. The weight of these parts overcomes the tendency of the weight M to gravitate, and thereby creates a balance. The forked end of the arm P is secured to the under surface of the platform N, its other end extending downward, and, passing through the aperture B, is kept in proper position by the connection W, which has knife-edges $h$ at either end, one of which knife-edges works in a properly-proportioned notch in the lower end of the arm P, and the other knife-edge in a similar notch in the lug X, rigidly attached to the lower interior portion of the base A, immediately beneath the standard D. This method of connection on knife-edges reduces friction to a minimum, and adds greatly to delicacy of scale.

One side of the weight is employed as the dial-face, the indexes, denoting the pounds, ounces, and fractions thereof, being arranged along the lower edge of the same, and the index-needle $a$ used to indicate the weight on the platform, and is rigidly secured to the standard D, but having its pointed end extending outward and downward, or otherwise, as desired, so as to be in juxtaposition to the indexes.

The brake $b$ is constructed with an arm extending between and beyond the standards D, and curving upward so as to conform to the surface of the weight M, opposite which it is placed. From the other end of the brake an arm extends outward, the brake being mounted on a pivot between the standards D, and provided with a chock, $z$, to sustain it in proper relation to the weight M. By this means the operator can stop the vibration of the bent lever by simply pressing down the arm of the brake, which extends outward, as this throws the curved portion of the brake up against the weight M and checks its movement.

The set-screw $d$ is furnished to regulate, in a degree, the position of the weight M—that is to say, if the table or support of the scale should not be exactly level, and the point of the needle should not be pointing to the first index on the dial-plate, the adjustment could be remedied by either moving the screw upward or downward. Thus, if the needle should point to an index nearer the second index, it could be brought to the first index by simply moving the screw upward, thereby lowering that end of the scale, and permitting the weight to have a slight movement inward, bringing its first index opposite the point of the needle; or, if the point of the needle should be on the other side of the first index, the screw should be lowered, which operation would cause the weight M to move outward, and thereby bring the needle to the proper position.

Within the weight M are provided the threaded apertures $e'$ and $f'$, which serve as receptacles for the threaded counter-balances $e$ and $f$, which serve to regulate the capacity of the device, the former having a horizontal and the latter a vertical movement. Thus, it is obvious that as either is retracted from or advanced toward the arm L the capacity of the scale is respectively increased or reduced, the leverage of the weight being accordingly increased or diminished.

What I claim as my invention, and desire to secure by Letters Patent, is—

1. In a scale, the bent weighted lever H, provided with apertures $e'$ $f'$, in which are inserted the adjustable counter-balances $e\ f$, substantially as set forth.

2. In a scale, the bent lever H, furnished on one side with a dial-face and mounted in properly-constructed bearings, substantially as set forth.

3. The bent lever H, provided with knife-edges I T and bearings E R, in combination with the forked arm P, substantially as set forth.

4. In a weighing-scale, a brake for stopping the vibration of the part or parts of the scale, substantially as set forth.

5. In a weighing-scale, a counter-balance capable of adjustment for the purpose of regulating the capacity of the scale, as set forth.

6. The bent lever H, provided with knife-edges I T, in combination with the forked platform-bearing arm P, connection W, knife-edges $h$, and lug X, substantially as expressed.

In testimony that I claim the foregoing improvement in weighing-scales as above described I have hereunto set my hand.

HENRY M. WEAVER.

Witnesses:
JOHN W. JENNER,
JACOB HADE.